United States Patent [19]

Lippmeier

[11] Patent Number: 5,039,014
[45] Date of Patent: Aug. 13, 1991

[54] AXISYMMETRIC VECTORING EXHAUST NOZZLE SEAL

[75] Inventor: William C. Lippmeier, Cincinnati, Ohio

[73] Assignee: General Electric Company, Cincinnati, Ohio

[21] Appl. No.: 618,003

[22] Filed: Nov. 26, 1990

Related U.S. Application Data

[63] Continuation of Ser. No. 336,380, Apr. 11, 1989, abandoned.

[51] Int. Cl.$^5$ .............................................. B64C 15/02
[52] U.S. Cl. .......................... 239/265.39; 239/265.33; 60/228; 60/271
[58] Field of Search ...................... 239/265.19, 265.33, 239/265.35, 265.37, 265.39, 265.41; 244/230, 110 B, 52; 60/227, 228, 230, 232, 271; 277/93, 181, 12

[56] References Cited

U.S. PATENT DOCUMENTS

| | | | |
|---|---|---|---|
| 2,828,602 | 4/1958 | Gardiner | 239/265.39 |
| 3,044,258 | 7/1962 | Carlton et al. | 239/265.39 |
| 3,095,695 | 7/1963 | Gaubatz et al. | 239/265.39 |
| 3,979,065 | 9/1976 | Madden | 239/265.39 |
| 4,049,199 | 9/1977 | Nightingale | 239/265.39 |
| 4,128,208 | 12/1978 | Ryan et al. | 239/265.39 |
| 4,141,501 | 2/1979 | Nightingale | 239/265.39 |
| 4,176,792 | 12/1979 | McCardle, Jr. | 239/265.41 |
| 4,196,856 | 4/1980 | James | 239/265.39 |
| 4,219,156 | 8/1980 | Schwaerzler | 239/265.35 |
| 4,245,787 | 1/1981 | Freid | 239/265.41 |
| 4,311,276 | 1/1982 | Hall | 239/265.39 |
| 4,363,344 | 12/1982 | Bouiller et al. | 239/265.35 |
| 4,456,178 | 6/1984 | Jones et al. | 239/265.39 |
| 4,508,270 | 4/1985 | Joubert | 239/265.35 |
| 4,575,006 | 3/1986 | Madden | 239/265.29 |
| 4,690,330 | 9/1987 | Robinson et al. | 239/265.39 |

OTHER PUBLICATIONS

Popular Science, Feb., 1989, X-31 Fighter, Thrust Vectoring of Pitch and Yaw Plane by Deflection of Exhaust, X-31A Aircraft pp. 58-64.
ISABE 87-7061, "Thrust Vectoring—Why and How?", Dr. W. B. Herbst, Thrust Vectoring of Pitch and Yaw Plane by Deflection of Exhaust, X-31A Aircraft.

*Primary Examiner*—Andres Kashnikow
*Assistant Examiner*—Christopher G. Trainor
*Attorney, Agent, or Firm*—Jerome C. Squillaro

[57] ABSTRACT

An interflap segmented seal is provided for use between adjacent flaps of an axisymmetric vectorable exhaust nozzle in order to minimize flow loss therebetween when the flaps are pivoted through different angles in order to turn the exhaust flow and vector the thrust. The overlapping seal segments are mounted to a backbone having an elliptical cross-section by a flange with a lobed hole in it through which the backbone passes. Spacers between the flanges axially position the individual segments from each other. Variable movement between adjacent flaps produces different angles between the sealing edges of the flaps which are often skewed with respect to each other and the flexibility afforded by the seals of the present invention allows the seals to minimize the leakage between the flaps and the seals.

19 Claims, 6 Drawing Sheets

AXISYMMETRIC VECTORING EXHAUST NOZZLE SEAL

This is a continuation of application Ser. No. 07/336,380, filed Apr. 11, 1989, now abandoned.

BACKGROUND OF THE INVENTION

1. Field of the Invention

This invention relates to gas turbine engine exhaust nozzles and, more particularly, to seals for use between divergent flaps of axisymmetric vectorable exhaust nozzles.

2. Description of the Prior Art

Variable area axisymmetric nozzles are well known in the field and employed in such engines as the General Electric F110 engine. The exhaust nozzles of such engines use convergent divergent flaps and seals to aerodynamically control the exhaust flow to transform the pressure and thermal energy of the combustion discharge airflow into velocity and forward thrust for the engine. The manner and means to provide such nozzles are shown in many publications including U.S. Pat. Nos. 4,176,792, 4,245,787, and 4,128,208 entitled "Variable Area Exhaust Nozzle", Arthur McCardle, Jr., "Variable Area Nozzle System", Wilbert B. Freid, "Exhaust Nozzle Flap Seal Arrangement", Edward W. Ryan, et al, assigned to the same assignee and incorporated herein by reference. A new function, namely thrust vectoring, has been added to this type of nozzle as represented by an invention developed at the General Electric Company.

For an understanding of how the individual flaps and seals interrelate and operate to form the overall nozzle and thrust vectoring function, reference may be made to the patent application Ser. No. 336,369 entitled "Axisymmetric Vectoring Exhaust Nozzle", Thomas P. Hauer et al, filed with the present application and assigned to the same assignee. Interflap sealing for axisymmetric convergent divergent nozzles has always posed an interesting problem and challenge to gas turbine engine nozzle designers as evidenced by the many designs, arrangements and patents, some of which are cited herein.

Conventional nozzles including ones with variable throat and exit areas employ nozzle flaps and nozzle flap seals that pivot through the same angles or change their attitude with respect to an engine centerline generally simultaneously so there is no circumferential variation in their respective attitudes or pivot angle with respect to an engine or nozzle centerline. The axisymmetric vectoring nozzle adds a new dimension to an already difficult problem namely how to seal between two surfaces whose orientation or attitude is constantly changed. The present invention addresses the sealing problems of an interflap seal which provides sealing between two adjacent divergent flaps that are pivoted through different angles from one and other and with respect to an engine centerline. Each flap can be pivoted in a coning motion relative to the convergent flap or other other nozzle element to which it is attached. Another way of describing the problem is that there is a circumferential variation in nozzle flap attitudes with respect to an engine or nozzle centerline.

As with all nozzle and gas turbine engine system designs it is desirable that they be light weight, easy and relatively inexpensive to manufacture, maintain and repair and be highly durable in a high temperature and stress environment.

Accordingly, a primary object of the present invention is to provide sealing between nozzle flaps of a gas turbine engine axisymmetric vectoring exhaust nozzle.

Another object of the present invention is to provide sealing between the divergent flaps of a gas turbine engine axisymmetric vectoring variable exhaust nozzle.

Another object of this invention is to provide sealing between divergent flaps of a gas turbine engine axisymmetric vectoring variable exhaust nozzle wherein adjacent flaps are rotated through different angles or attitudes with respect to the nozzle centerline during vectoring operations.

Yet another object of this invention is to provide sealing between the divergent flaps which maintains axial and circumferential sealing integrity throughout the range of circumferential variation in nozzle flap attitudes with respect to the nozzle centerline.

A further object of the present invention is to provide sealing means between the divergent flaps of an axisymmetric vectoring variable exhaust nozzle which is light in weight and easy to manufacture and repair.

Yet another object of the present invention is to provide seal segments for an interflap seal for use in an axisymmetric vectoring variable exhaust nozzle that facilitate the repair and maintenance of the seal and nozzle.

These objects and other features and advantages become more readily apparent upon reference to the following description when taken in conjunction with the appended drawings.

SUMMARY OF THE INVENTION

Briefly, in accordance with one aspect of the invention, a divergent seal comprises a backbone which provides longitudinally extending support and is preferably hollow and has a somewhat elliptical cross section and at its forward end is a means for orbitably connecting the backbone to a convergent seal stationary member of the nozzle. A plurality of seal segments are axially disposed along the backbone and include mounting means to attach the segment to the backbone in such a manner that during nozzle operation adjoining segments are in overlapping sealing engagement. The longitudinally extending sealing sections have inner and outer facing surfaces wherein the outer facing surfaces are designated as facing the nozzle exhaust gas flow and a flange attached to the sealing section includes a mounting means which comprises a cloverleaf hole to mount the seal segment in a way which allows the segment to twist about the axis of the backbone.

A more particular embodiment of the seal includes a seal segments wherein the sealing section is curved outward in the direction which the outer surface faces. The segments are curved or bowed out toward the nozzle centerline and there is a variation in their curvature along the backbone with the segments at the aft end being the most curved and the forward most segment having the least degree of curvature.

In the drawings as hereinafter described, the preferred embodiment is depicted; however, various other modifications and alternative constructions can be made thereto without departing from the true spirit and scope of the invention.

DESCRIPTION OF THE PREFERRED EMBODIMENT

Figure 1:
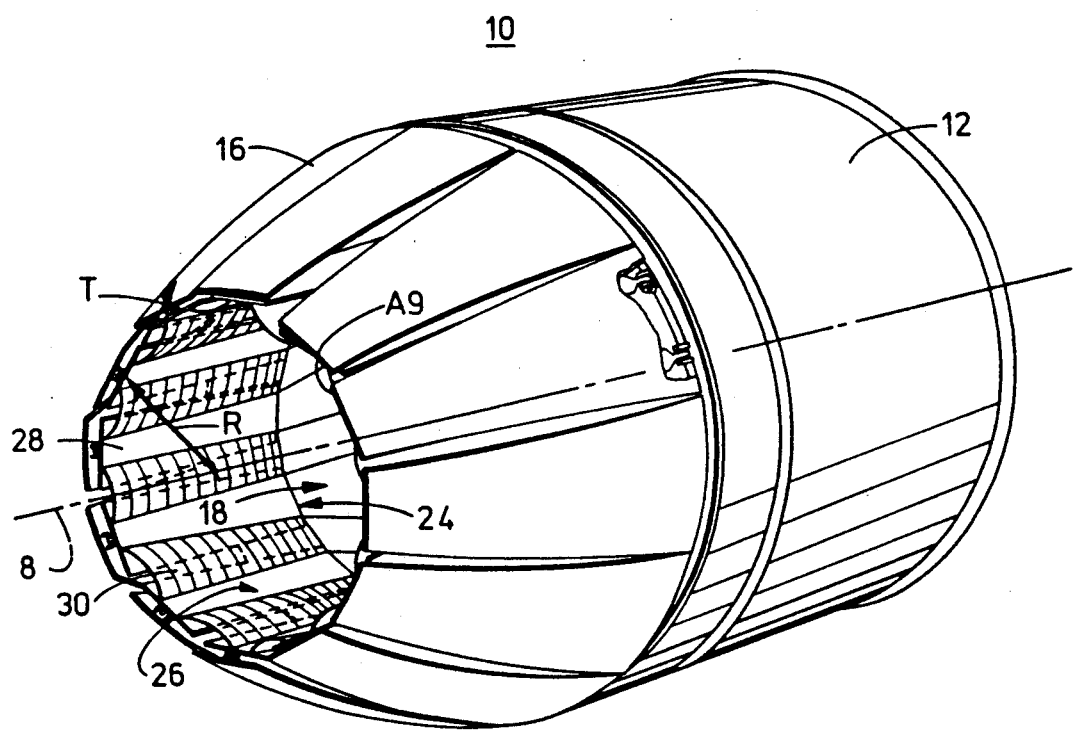
FIG. 1 is a perspective view of a gas turbine engine axisymmetric thrust vectoring variable exhaust nozzle section and seal means in accordance with the present invention.
Figure 2:
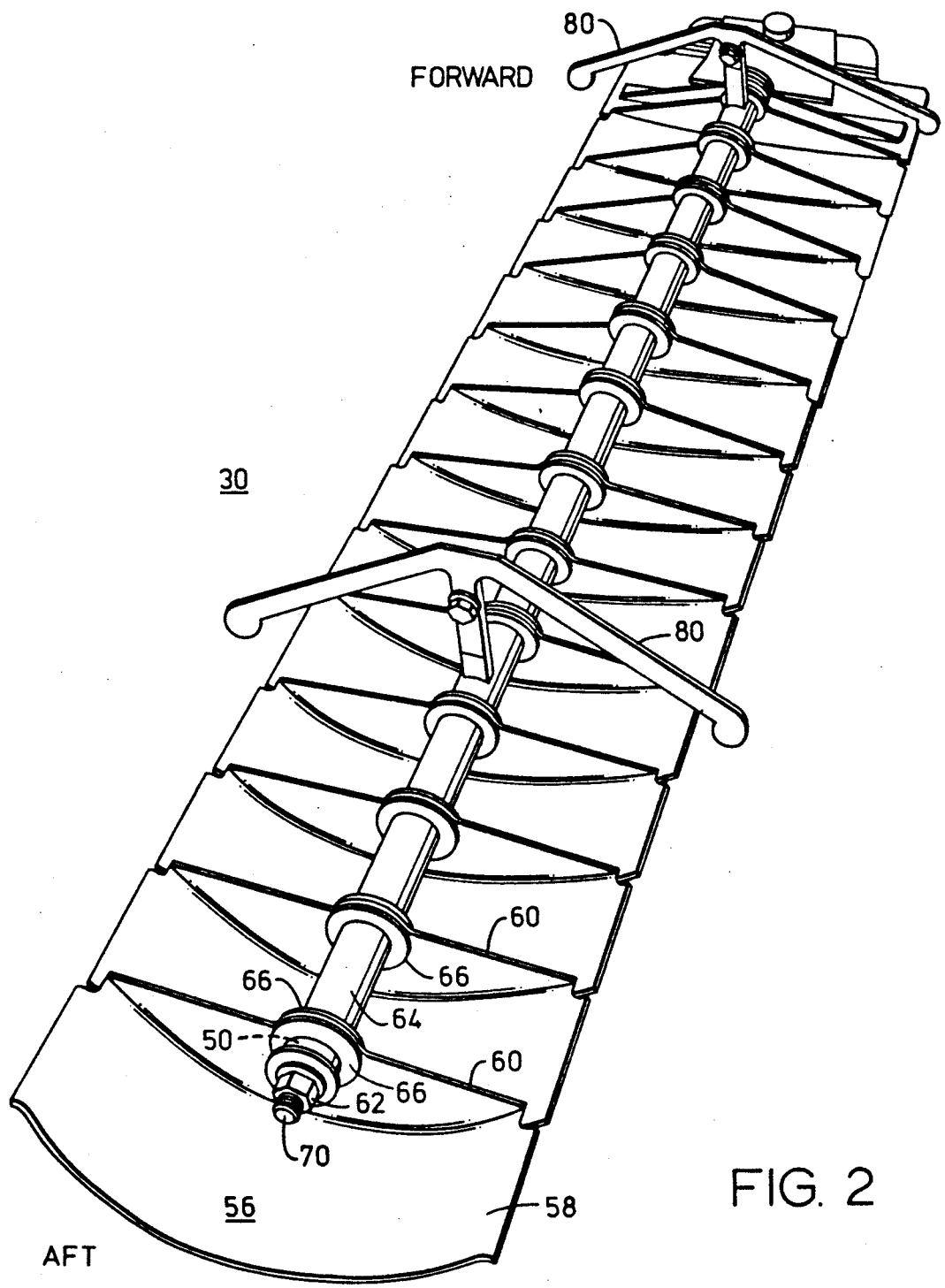
FIG. 2 is a perspective view of the divergent seal of the present invention.

Referring now to FIG. 1 a gas turbine engine axisymmetric vectoring nozzle is general shown at 10 comprising a casing 12 and in serial flow relationship a convergent section 18, a throat 24, and a divergent section 26 in accordance with the preferred embodiment of the nozzle disclosed in patent application Ser. No. 336,369 entitled "Axisymmetric Vectoring Exhaust Nozzle", Thomas P. Hauer et al. The present invention is generally shown as divergent seal 30 circumferentially disposed between divergent flaps 28 which are circumferentially disposed about the axisymmetric nozzle centerline 8. Divergent flaps 28 are controlled so as to define the exhaust path of the nozzle and the direction of the exhaust flow 40. Outer flaps 16 provide an aerodynamic fairing around the convergent and divergent sections of nozzle 10. Conventional operation of axisymmetric nozzles involved opening and closing of the exit area of the nozzle A9 or the throat area A8 or both. In either case the nozzle configuration remained axisymmetric and the the attitude of each divergent flap 28 with respect to each other divergent nozzle flap remained generally the same. In the preferred embodiment of the invention a divergent seal 30 is provided to accommodate means are for vectoring the thrust of the engine by pivoting the different divergent flaps 28 to different angles from their axisymmetric positions. The divergent flaps are pivoted in the radial direction R with respect to the axisymmetric nozzle centerline 8 and in the tangential direction T (more clearly shown in FIGS. 10 and 11). Another way of looking at the vectoring operation is that by forming an asymmetric divergent nozzle section 26 circumferentially adjacent divergent flaps are pivoted or rotated to attitudes that are different from the attitudes of the adjacent flaps.

Referring to FIGS. 2, 3, 4 and 9; a divergent seal 30 includes a longitudinally extending support means or backbone 50 and a plurality of unique seal segments 56 axially disposed on the backbone. Each seal segment 56 includes a sealing section 58 cantilevered off a flange 60 to which is attached to the backbone 50 in a manner so that during engine operation adjacent seal segments are in overlapping sealing engagement. Briefly referring to FIG. 9, the preferred embodiment has sealing section 58 cantilevered off a flange 60 at an angle somewhat greater than 90° which provides a means to place longitudinally adjacent seal segments in overlapping sealing engagement during engine operation.

Figure 3:
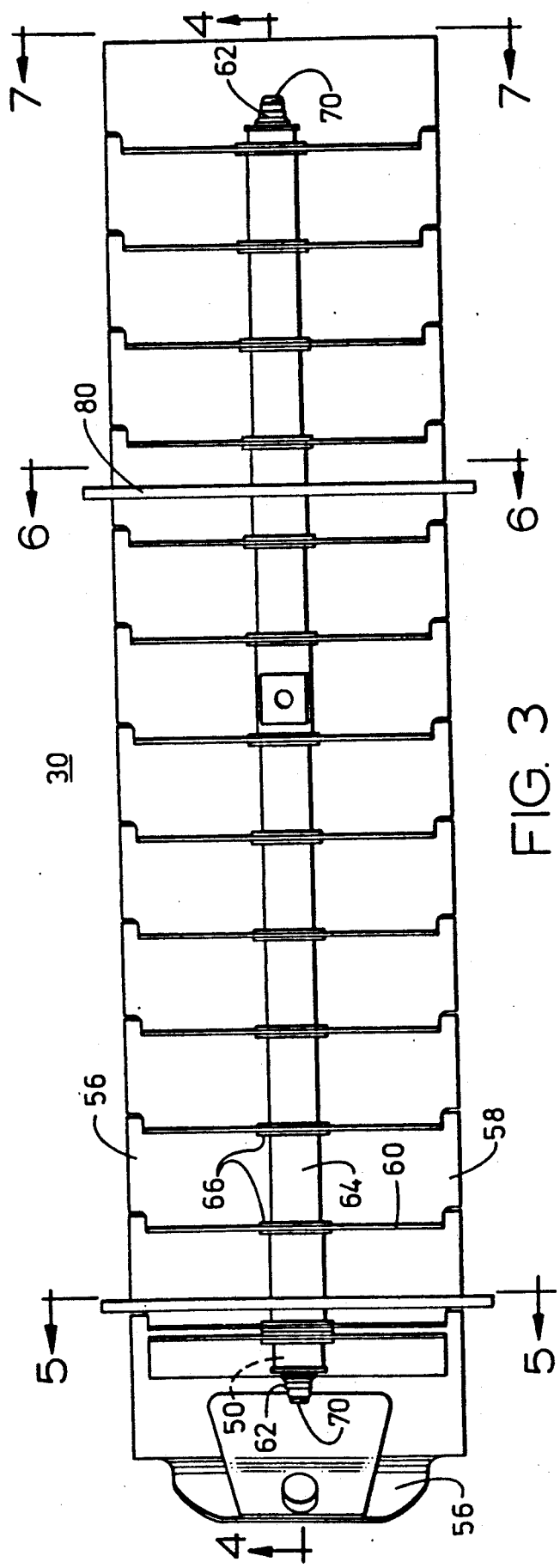
FIG. 3 is a top view, one taken looking at the side of the seal facing away from the nozzle exhaust flow, of the interflap seal of the present invention.
Figure 4:
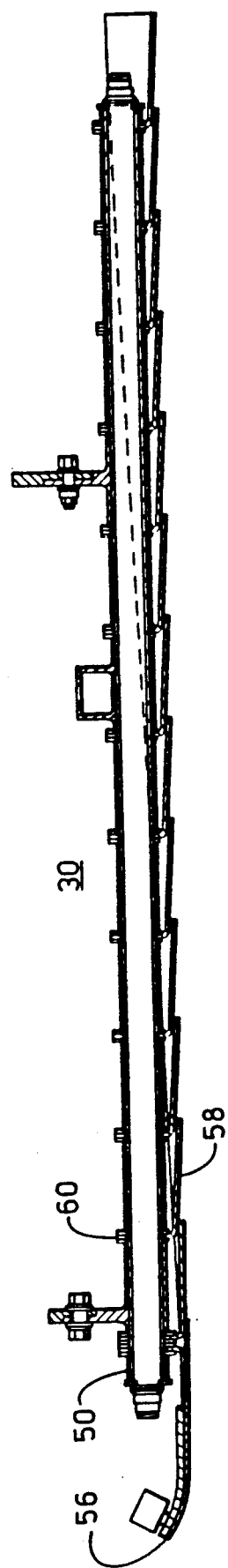
FIG. 4 is a cross sectional view of the seal in FIG. 2. along its axial centerline.
Figure 8:
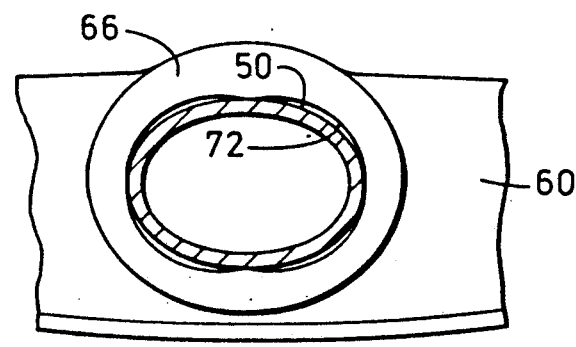
FIG. 8 is a cross section of the seal in FIG. 2, aft looking forward, taken through a flange of a sealing segment.
Figure 9:
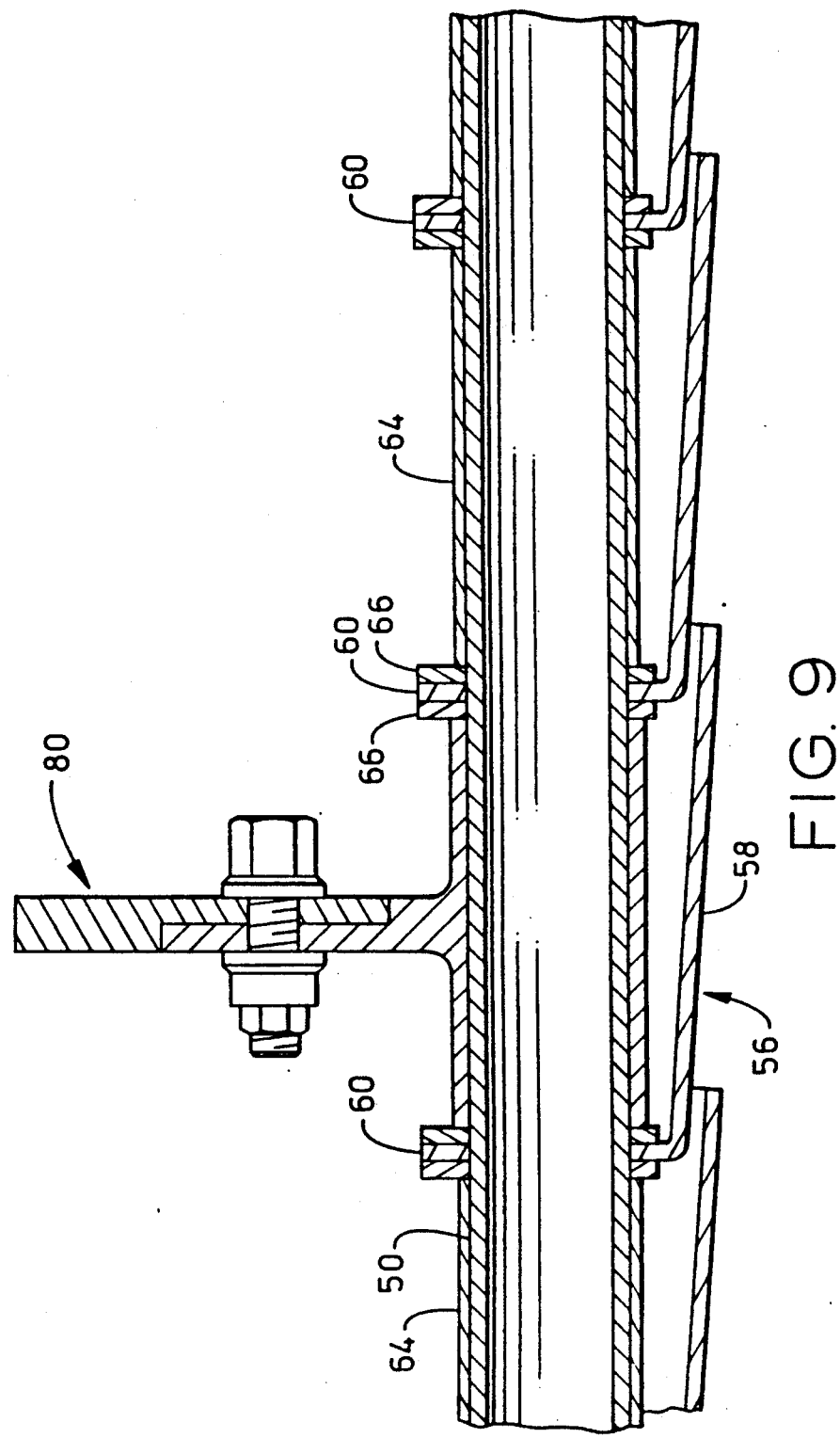
FIG. 9 is an exploded view of the cross section view of the seal in FIG. 4.

Each sealing section 58 of each seal segment 56 is unique along the backbone. The difference is in the curvature or bowing out of the sealing section. The greatest amount of curvature is at the aft end of the seal as can be clearly seen in FIG. 2. This can further be seen from the gradual curving of the interface between the flange 60 and the sealing section 58 of each successive seal segment 56 from the forward most to the aft most one. The planform area as seen in FIG. 3 preferably remains the same in each of the segments. This difference is provided to accommodate the larger gaps between adjacent divergent flaps 28 that exist at the aft end of the nozzle as opposed to the forward end of the divergent section of the nozzle. Preferably segment 56 is stamped out of sheet metal where a different die set is required for each segment and allows for accurate contouring of each segment. Preferably there are twelve divergent seals 30 in each nozzle and savings is accomplished by having each set of segments along a given seal be the same from seal to seal circumferentially around the nozzle. The flange attachment means includes a spacer 64 between flanges 60 and washers 66 between the flange and spacer. Each end of backbone 50 is fitted with a bolt end cap 70 upon which nut 62 is threaded and used to tighten up the assembly. Referring now to FIG. 8 for a moment, a more detailed cross-section of the flange 60 mounted to the backbone 50 is shown. Flange 60 includes a clover shaped aperture 72 therethrough for receiving backbone 50 which is shown as a hollow tube having an elliptical cross section.

Figure 5:
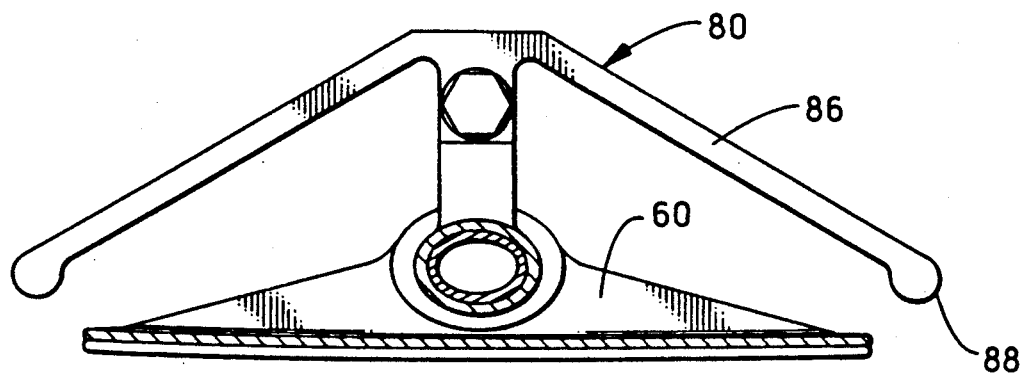
FIG. 5 is a cross section of the seal in FIG. 2, aft looking forward, taken at a relatively upstream station of the seal and depicting relatively small bowing of a sealing segment.
Figure 6:
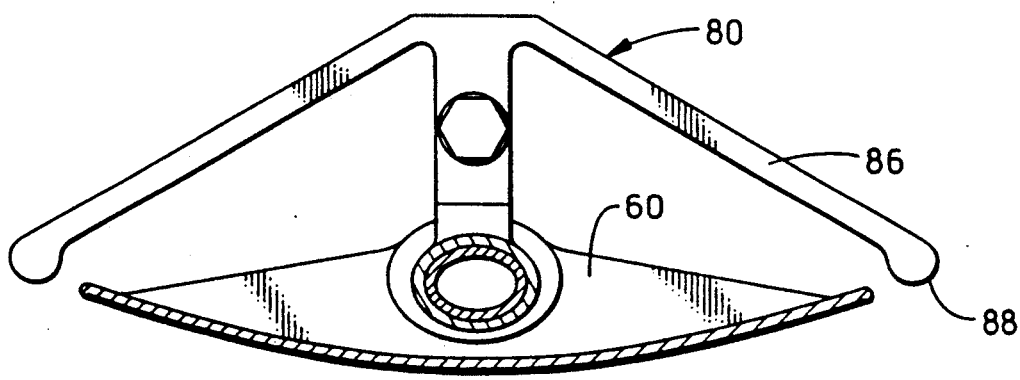
FIG. 6 is a cross section of the seal in FIG. 2, aft looking forward, taken at a relatively downstream station of the seal and depicting relatively large bowing of a sealing segment towards the aft end of the seal.
Figure 7:
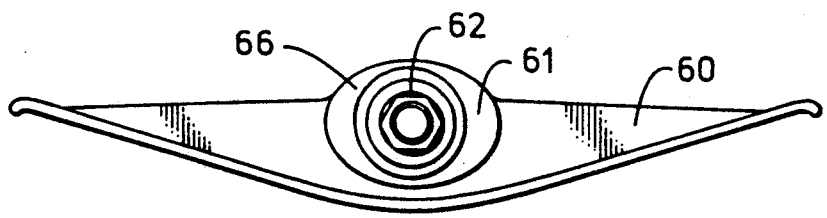
FIG. 7 is an aft end view looking forward of the seal in FIG. 2.

Referring to FIGS. 5 and 6 seal retaining means 80 are shown which include a rail arm 86 and rail 88 which fit into and ride in tracks attached to adjacent divergent flaps which are not shown. Such a track and rail system comprise a seal retaining system used to align the seals and the adjacent flaps in a manner known and shown in the art. Retaining means 80 is mounted to the backbone by a suitable means such as being attached to a spacer 64.

Figure 10:
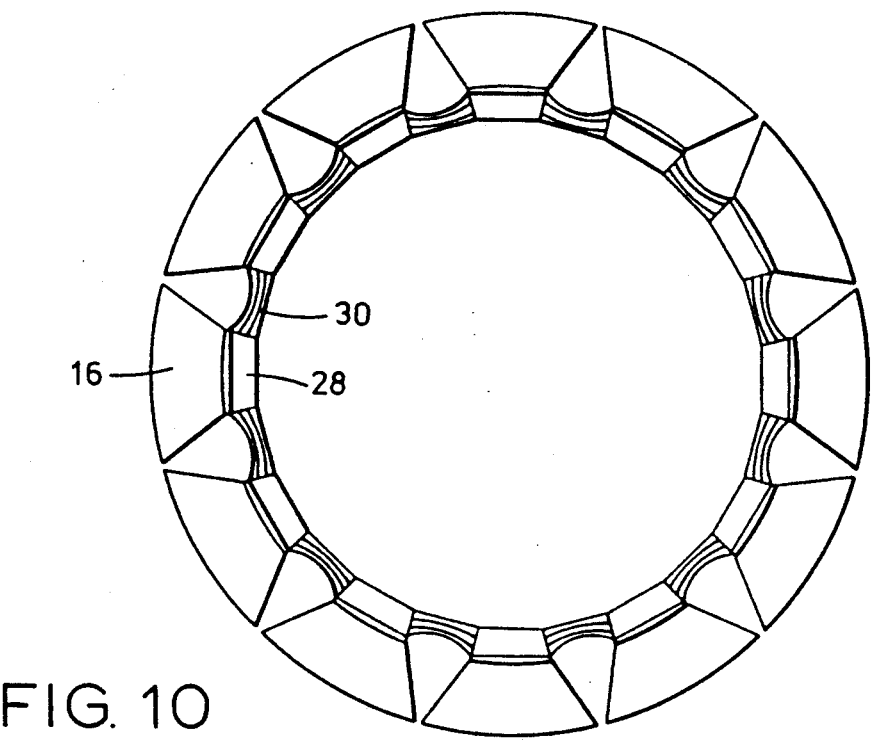
FIG. 10 is an aft looking forward view of FIG. 1 showing the exhaust nozzle at 0 degrees of deflection or vectoring angle.
Figure 11:
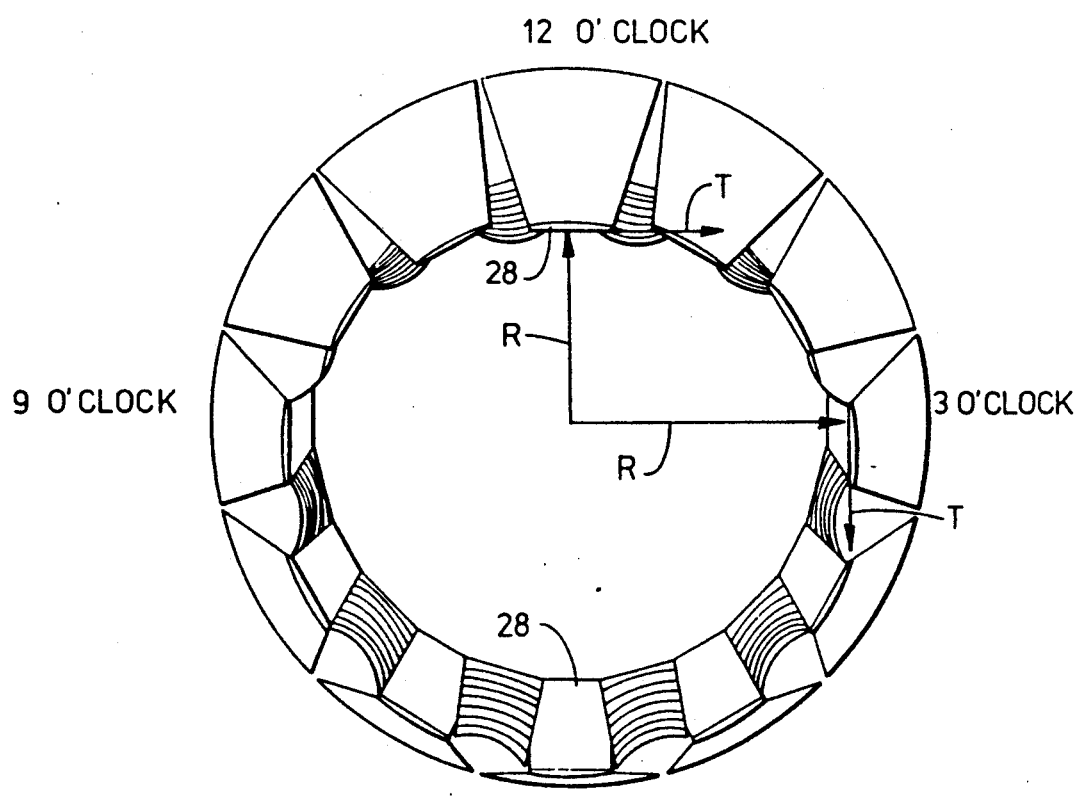
FIG. 11 is an aft looking forward view of FIG. 1 showing the exhaust nozzle at an exemplary negative degrees of deflection or vectoring angle.

In operation the axisymmetric nozzle configuration of FIG. 10 is made asymmetric as shown in FIG. 11 by pivoting divergent flaps 28 in the radial and tangential directions as noted by R and T respectively. The example shown in FIG. 11 vectors the exhaust flow in the downwards direction to produce a thrust vectored in the pitch plane. Though the flaps are shown pivoted generally downwards at 6 O'clock the orientation of the tilt may be changed to 9 O'clock thereby producing a thrust vectored in the yaw plane. Finally another orientation of the tilt would produce a combination of pitch and yaw vectored thrust, a much sought after and highly desirable capability for gas turbine engines.

During operation the high pressure exhaust gases push all the flaps and seals outward wherein the flaps are held in place by their actuating systems and the seals are held in place by the seal retaining means 80. The radially outward forces due to the high pressure force the seals which are in overlapping engagement with and radially inward of the adjacent flaps into fluid sealing engagement. The present invention keeps the divergent seals and associated seal segments and sealing sections properly aligned with respect to the divergent flaps when the flaps are pivoted in a manner to produce an asymmetric divergent nozzle section for thrust vectoring. The present invention also minimizes leakage during the thrust vectoring operation. The present invention also seals between the flaps during the more conventional pivoting of the divergent and convergent flaps to vary the throat area and nozzle exhaust area, so as to maximize sealing with the flaps and minimize leakage. As can be seen in FIGS. 2 through 8 each seal segment 56 can twist about backbone 50 so to better orient itself or align its sealing segment 56 to maximize sealing with adjacent divergent flaps 28. The force to accomplish this is supplied by the high pressure exhaust gases in the nozzle. The curvature or bowing outward of seal segment 56 further enhances the sealing function by always keeping the sealing segment in tension pressed against the divergent flaps.

Having thus described what is considered novel and desired to be secured by Letters Patent of the United States, I claim:

1. An aircraft gas turbine gas engine nozzle interflap seal segment for mounting on a longitudinally extending support means which supports a plurality of such segments, said segment comprising:
   a longitudinally extending sealing section having inner and outer facing surfaces wherein said outer facing surface is designed to face the nozzle exhaust gas flow,
   said sealing section cantilevered off of a flange in the longitudinal direction so as to place longitudinally adjacent ones of said seal segments in overlapping sealing engagement during engine operation, and
   a mounting means to attach said flange to the longitudinally extending support means.

2. An aircraft gas turbine engine nozzle interflap seal segment as claimed in claim 1 wherein said mounting means includes a means to allow said segment to twist about a longitudinal axis.

3. An aircraft gas turbine engine nozzle interflap seal segment as claimed in claim 2 wherein said mounting means comprises a cloverleaf hole in said flange.

4. An aircraft gas turbine engine nozzle interflap seal segment as claimed in claim 3 wherein said sealing section is laterally curved.

5. An aircraft gas turbine engine nozzle interflap seal segment as claimed in claim 4 wherein at least a portion of said sealing section is curved outward toward the exhaust gas flow.

6. An aircraft gas turbine engine nozzle interflap seal segment as claimed in claim 5 wherein said sealing section has an increasing degree of curvature towards the aft end of said seal section.

7. An aircraft gas turbine engine nozzle interflap seal segment as claimed in claim 6 wherein said segment is formed from a single piece of sheet metal.

8. An aircraft gas turbine engine nozzle divergent seal segment for mounting on a longitudinally extending support means for mounting a plurality of such segments, said segment comprising:
   a longitudinally extending sealing section having inner and outer facing surfaces wherein said outer facing surface is designed to face the nozzle exhaust gas flow,
   said sealing section cantilevered off of a flange so as to place longitudinally adjacent ones of said seal segments in overlapping sealing engagement during engine operation, and
   a mounting means to attach said flange to the longitudinally extending support means.

9. An aircraft gas turbine engine nozzle divergent seal segment as claimed in claim 8 wherein said mounting means includes a means to allow said segment to twist about a longitudinal axis.

10. An aircraft gas turbine engine nozzle divergent seal segment as claimed in claim 9 wherein said mounting means comprises a cloverleaf hole in said flange.

11. An aircraft gas turbine engine nozzle divergent seal segment as claimed in claim 10 wherein said sealing section is laterally curved.

12. An aircraft gas turbine engine nozzle divergent seal segment as claimed in claim 11 wherein at least a portion of said sealing section is curved outward towards the exhaust gas flow.

13. An aircraft gas turbine engine nozzle divergent seal segment as claimed in claim 12 wherein said sealing section has an increasing degree of curvature towards the aft end of said sealing section.

14. An aircraft gas turbine engine nozzle divergent seal segment as claimed in claim 13 wherein said segment is formed from a single piece of sheet metal.

15. An aircraft gas turbine engine nozzle divergent seal comprising:
   a backbone,
   a plurality of seal segments serially mounted on said backbone,
   each of said segments comprising a longitudinally extending sealing section having inner and outer facing surfaces wherein said outer facing surfaces is designed to face the nozzle exhaust gas flow, a flange attached to said sealing section, and a mounting means to attach said flange to said backbone such that said mounting means includes a means to allow said segment to twist about said backbone.

16. An aircraft gas turbine engine nozzle divergent seal segment as claimed in claim 15 wherein said mounting means comprises a cloverleaf hole in said flange and said backbone has an eliptical cross section.

17. An aircraft gas turbine engine nozzle divergent seal as claimed in claim 16 wherein at least a portion of said sealing section is laterally curved outward towards the exhaust gas flow.

18. An aircraft gas turbine engine nozzle divergent seal as claimed in claim 17 wherein said sealing sections have an increasing degree of curvature towards the aft end of said sealing section.

19. An aircraft gas turbine engine nozzle divergent seal as claimed in claim 18 wherein said segment is formed from a single piece of sheet metal.

* * * * *